United States Patent [19]
Jones et al.

[11] Patent Number: 5,235,611
[45] Date of Patent: Aug. 10, 1993

[54] STEPPED END ROTARY FURNACE

[75] Inventors: Kenneth R. Jones; Charles G. Armstrong, both of Greenville, Tenn.

[73] Assignee: Tennessee Electro Minerals, Inc., Greenville, Tenn.

[21] Appl. No.: 806,123

[22] Filed: Dec. 12, 1991

[51] Int. Cl.$^5$ .............................................. H05B 1/00
[52] U.S. Cl. ........................................ 373/20; 373/62; 373/72; 65/DIG. 4; 110/341; 432/239
[58] Field of Search ........................ 373/20, 19, 18, 62, 373/72; 110/341; 65/DIG. 4; 432/239, 106, 160, 161

[56] References Cited

U.S. PATENT DOCUMENTS

| 2,104,555 | 1/1938 | Cousteix. | |
|---|---|---|---|
| 2,121,109 | 6/1938 | Weinheimer | 432/239 |
| 2,997,006 | 8/1961 | Grosse | 110/341 |
| 3,102,154 | 8/1963 | Renton | 373/62 |
| 3,795,752 | 3/1974 | Verhoeven et al. | 373/20 |
| 3,821,455 | 6/1974 | Greenewald | 373/20 |
| 3,937,866 | 2/1976 | Sunnen et al. | |
| 4,217,462 | 8/1980 | Rawles et al. | |
| 4,346,523 | 8/1982 | Ronning | 34/17 |

FOREIGN PATENT DOCUMENTS 14-13837 9/1939 Japan.
330943 7/1930 United Kingdom.

OTHER PUBLICATIONS

H. George, "Electrical Furnaces With Carbon Radiator," *Transactions of the American Institute of Electrical Engineers*, vol. 54, pp. 1195–1199 (New York 1935).

Primary Examiner—Geoffrey S. Evans
Assistant Examiner—Tu Hoang
Attorney, Agent, or Firm—Willian Brinks Olds Hofer Gilson & Lione

[57] ABSTRACT

The invention is directed to improved centrifugal rotary electric furnaces which are used for the heating and or fusion of minerals, such as quartz, and other materials having a high melting point. The furnace includes a generally cylindrical furnace shell and a decreasing diameter stepped end member attached to each end of the shell which is intended to more closely conform the end of the furnace to the shape of fused ingot or melted charge formed inside the furnace, while still providing a sufficient depth of unmelted charge between the fused or melted material and the end member to insulate the end member from excessive heat and the warpage and other damage caused thereby.

23 Claims, 2 Drawing Sheets

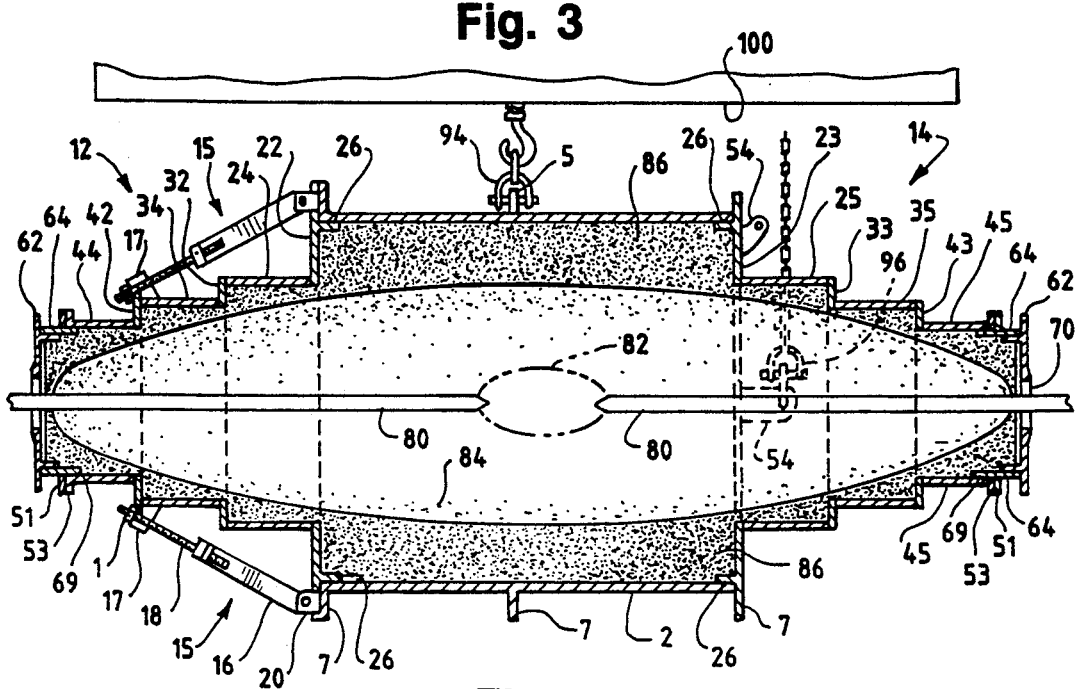
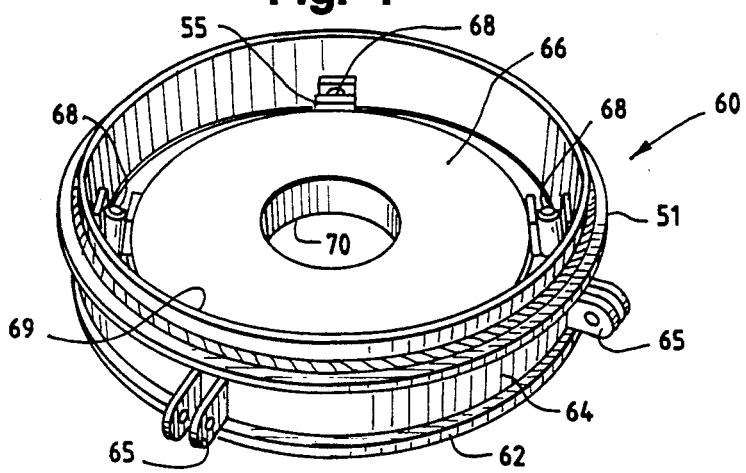
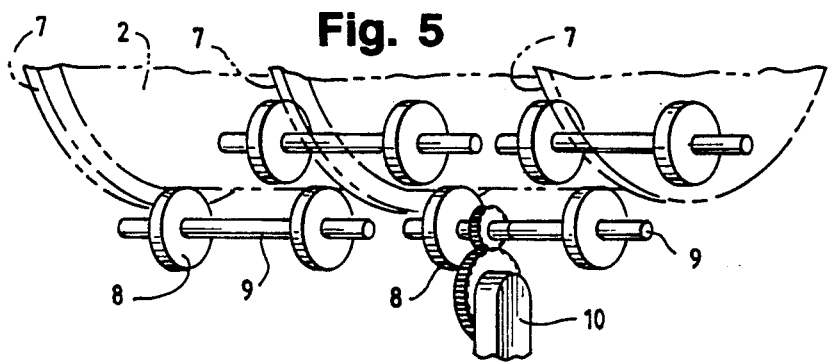

STEPPED END ROTARY FURNACE

BACKGROUND OF THE INVENTION

Rotary electric furnaces have been used since at least the 1930's for the heating and/or fusion of minerals, such as quartz, and other materials having a high melting point. In such furnaces, the material being heated and/or melted is pressed against the walls of the furnace by centrifugal force and may be used in lieu of a refractory lining to insulate the furnace from the heat produced by the electrical power source.

Such furnaces normally include a cylindrical shell, the outer surface of which is engaged by a drive means to effect rotation of the shell. The cylindrical shell is normally closed by ends which have an axial opening to permit the introduction of an electrode. Over the years, both flat, frusto-conical, and conical ends have been employed in such furnaces, the later because they tend to more closely approximate the inherent cocoon (prolate spheroid) shape of the ingot formed inside the rotary furnace, thereby reducing the amount of raw material needed to fill the furnace for the production of a given size ingot. Such furnaces are disclosed, for example, in British Patent No. 330,943 to Heraeus; H. George, "Electric Furnaces With Carbon Radiator," *Transactions of the American Institute Of Electrical Engineers*, Vol. 54, pp. 1195-1199 (1935); U.S. Pat. No. 2,104,555 to Cousteix; U.S. Pat. No. 3,937,866 to Sunnen et al.; and U.S. Pat. No. 4,217,462 to Rawles et al.

More recently, applicant's assignee has employed rotary electric arc furnaces for silica fusion which use ends having a reduced diameter frusto-conical portion adjacent to the cylindrical shell and a removable cylindrical cover attached to the smaller end of the frusto-conical portion. In this configuration, the frusto-conical portion is designed to conform to the shape of the ingot to be produced in the furnace and to reduce the amount of raw material needed to fill the furnace. The cylindrical cover is designed to reduce heat distortion and warpage of the furnace ends that tends to occur close to the axis of the furnace, where the electrodes are inserted and where there is little, if any, self-insulating raw material to protect that portion of the furnace from the heat generated by the electrodes. Normally, this cylindrical cover is lined with a ring-shaped refractory insert to further reduce heat damage to the ends of the furnace.

However, the frusto-conical ends of such furnaces are difficult to fabricate and rather expensive to produce. In addition, furnaces employing the frusto-conical design experience a lack of balance during rotation, resulting in an increased wear and tear of parts of the rotary furnace.

SUMMARY OF THE INVENTION

The invention is directed to improved centrifugal rotary electric furnaces which are used for the heating and or fusion of minerals, such as quartz, and other materials having a high melting point. The furnace includes a generally cylindrical furnace shell and a unique, decreasing diameter stepped end member attached to each end of the shell which is intended to more closely conform the end of the furnace to the shape of fused ingot or melted charge formed inside the furnace, while still providing a sufficient depth of unmelted charge between the fused or melted material and the end member to insulate the end member from excessive heat and the warpage and other damage caused thereby.

Preferably, the stepped end members include an alternating series of concentric annular plates and ring members, each having a different diameter. The annular plate having the largest diameter is attached to one end of the cylindrical furnace shell and to the largest diameter ring member. The annular plate having the second largest diameter is attached to the largest diameter ring member and to the second largest ring member. Any additional annular plates, other than the one having the smallest diameter, is attached to two ring members with the larger diameter ring member being closer to the furnace shell than the smaller diameter ring member. Preferably, a cover is secured to the smallest diameter ring member. Preferably, both stepped end members are detachably secured to the shell.

The stepped end rotary furnace is easier and cheaper to fabricate than the prior art frusto-conical design furnace, and provides for a more efficient design. It is much simpler to manufacture a series of cylindrical rings of varying size and weld them to an alternating series of annular plates than to fabricate a large frusto-conical shape. In addition, because the cylindrical rings produce a more balanced rotation than the previously used frusto-conical end design, less wear and tear is produced in certain parts of the furnace, especially the wheels and shafts which impart rotation to the furnace.

Moreover, the stepped end construction entraps the charge on the annular plates and the cover. This protects and extends the life of the refractory lining on the cover, and also reduces contamination to the fused silica product. Finally, the cover is removable to provide easy maintenance and replacement of the refractory lining preferably located on the inside of the cover.

BRIEF DESCRIPTION OF THE DRAWINGS

FIG. 3 is a vertical section of a preferred embodiment of a rotary furnace constructed in accordance with the invention, illustrating the electrodes, the fused ingot, and unfused raw material.

FIG. 4 is a perspective view of the removable cover shown in FIGS. 1 and 2.

FIG. 5 is a view of a preferred drive means for rotating a furnace constructed in accordance with the present invention.

DETAILED DESCRIPTION OF THE PREFERRED EMBODIMENT

Figure 1:
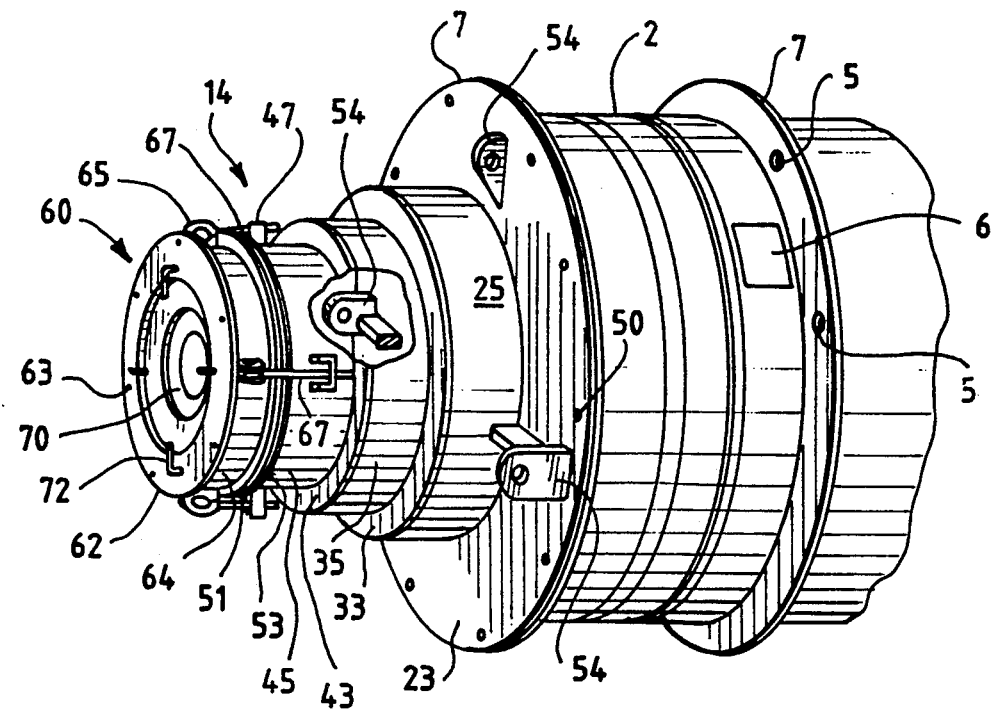
FIG. 1 is a perspective view of the non-dumping end of a preferred embodiment of a rotary furnace constructed in accordance with the present invention.
Figure 2:
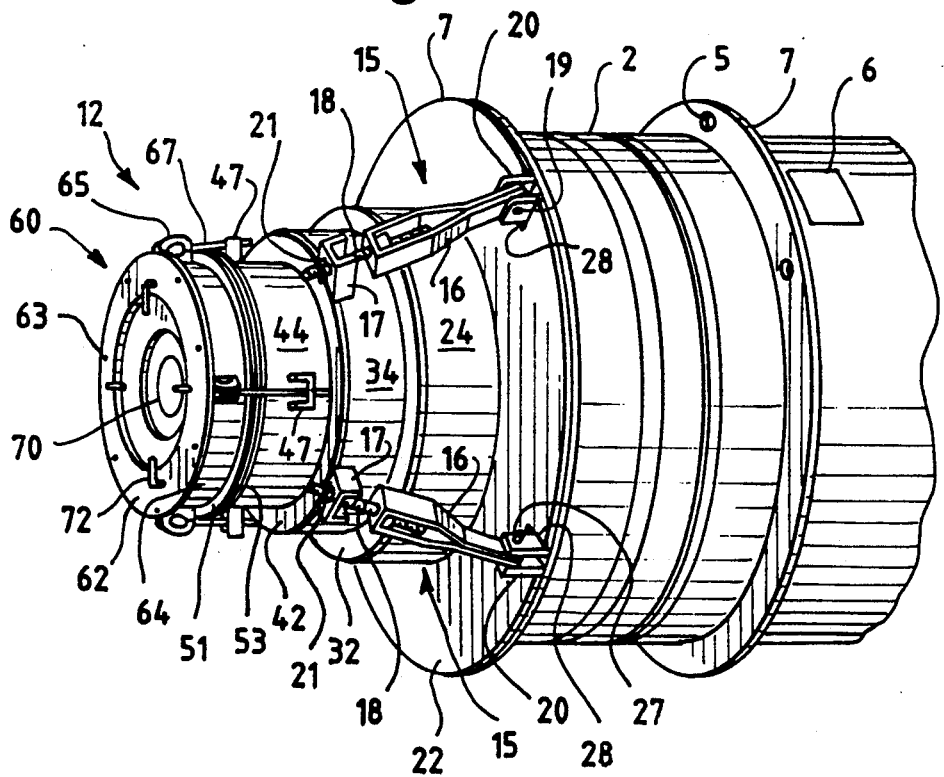
FIG. 2 is a perspective view of the dumping end of a preferred embodiment of a rotary furnace of the invention.

Referring to FIGS. 1, 2 and 3, a stepped end rotary furnace is shown having a generally cylindrically shaped shell 2 and two stepped end members 12, 14.

The shell 2 contains three flanges 7. The flanges 7 at the ends of the shell 2 are used to attach or secure the stepped end members 12, 14 to the shell 2. The flange 7 in the center of shell 2 has two bores 5 for receiving two clevises 94 from a crane. These flanges 7 also interact with transverse alignment rollers (not shown) associated with the drive means to insure that the rotating furnace remains positioned over the drive wheels. The shell 2 also includes a small door 6 (FIGS. 1 and 2) for loading the material to be fused or heated.

Preferably, the stepped end members 12, 14 are of substantially the same design, except possibly for their means of attachment to the shell 2, as is the case with the illustrated embodiment. In that preferred embodiment, one end 12 is referred to as the dumping end because it is normally removed at the end of each fusion cycle to remove the fused ingot and any unfused starting material. The other end 14 is referred to as the non-dumping end because it is not normally removed at the end of each fusion cycle. However, this non-dumping end 14 is preferably removable, as described below, to permit removal for routine maintenance and repair. A removable non-dumping end also facilitates easy modification, redesign and replacement. Alternatively, the furnace may be provided with two identical removable ends or the non-dumping end 14 may be welded or otherwise fixed to the furnace shell if so desired. The latter alternative, while not being removable for maintenance and repair, offers the advantage of avoiding the potential leakage of solid particles and/or molten material where the non-dumping end 14 is joined to the shell 2 at flange 7.

A preferred dumping end 12 is illustrated in FIGS. 2 and 3. It includes an alternating series of three concentric annular plates 22, 32, and 42 and three concentric cylindrical rings 24, 34, and 44. However, the dumping end 12 is not limited to having three concentric annular plates and rings. Rather, the dumping end 12 may have two concentric annular plates and rings or more than three concentric annular plates and rings.

As illustrated, each of the plates 22, 32, 42 and rings 24, 34, 44 on the dumping end has a different median diameter so that when they are properly attached to one another, they provide the desired stepped end plates should be sized so that the end of the furnace approximates the end of the cocoon shape of the fused ingot 84, while still allowing the unfused charge 86 to insulate the plates and rings from heat damage.

The cylindrical rings 24, 34, and 44 are concentrically aligned with the longitudinal axis of shell 2, as illustrated in FIG. 3. Preferably, the annular plates are sized such that the diameter of the outer rim of each annular plate corresponds to the outer diameter of the larger cylindrical ring to which it is welded, while the diameter of the inner rim of each annular plate is slightly larger than the outer diameter of the smaller cylindrical ring to which it is welded. Thus, one end of the largest diameter cylindrical ring 24 is welded to the inner rim of the largest diameter annular plate 22 while the other end of the ring 24 is welded to one side of the second largest diameter annular plate 32, near its outer periphery. One end of the second largest cylindrical ring 34 is welded to the inner rim of annular plate 32 while the other end is welded to the one side of the smallest diameter annular plate 42, near its outer rim. Finally, one end of cylindrical ring 44 is welded to the inner rim of annular plate 42. Consequently, a step shape is formed by the end 12.

Referring to FIGS. 1 through 4, a removable cover 60 is also provided for both ends of the furnace and includes a removable end plate 62 and ring shaped end housing 64. The end housing 64 contains a series of eyebrackets 65 for receiving eyebolt 67. The opposing end of each eyebolt is properly secured to a protrusion 47 in each of the cylindrical rings 44 and 45 by nuts, not shown. The end housing 64 contains a sleeve 69 which is sized, to fit within the interior portion of the smallest diameter cylindrical ring 44 or 45, providing a more secure seal between the removable cover 60 and the stepped end member 12 or 14. The end housing 64 may further include a flange 51 which abuts flange 53 secured to cylindrical ring 44, 45 to provide a more secure seal between the cover 60 and the stepped end 12 or 14.

Preferably, the removable cover 60 further includes a graphite refractory lining 66, as shown in FIG. 4. The refractory lining is secured to the cover 60 by plates 55 and bolts 68 fastened to the end cover 62, the plates wedging the refractory lining 66 in place. The removable end plate 62 is also secured to the end housing 64 by a series of bolts 63, as shown in FIGS. 1 and 2. The removable end plate 62 is provided with an opening 70 to accommodate the introduction of an electrode 80 into each of the ends of the rotary furnace. The end plate 62 is further provided with a series of clamps 72 for securing a cardboard cover, not shown, to prevent the escape of material from the opening 70 when the furnace is being filled, moved, and initially rotated.

In the illustrated embodiment, the dumping end 12 is bolted to the shell 2 of the furnace by four fastening members 15 equally spaced around the end, two of which are shown in FIGS. 2 and 3. Each fastening member 15 includes a eyebracket 20 mounted on flange 7 of the cylindrical shell 2 and a connecting arm 16 attached to the eyebracket 20 by bolt 19 and nut 27. The connecting arm 16 is secured to a protrusion 17 on cylindrical ring 34 of the dumping end 12 by a long bolt 18 and nut 21. The outer rim of annular plate 22 on end 12 has four indentations 28 which fit around the eyebrackets 20 on the shell, allowing the annular plate 22 to be secured to the flange 7. This dumping end 12 is normally removed, by loosening the nuts 21, and removing each of the four bolts 19 after each batch is fused, in order to remove or dump the hot ingot.

The rings 25, 35, and 45 and annular plates 23, 33, and 43 of the non-dumping end 14 are secured together in a similar fashion to those of the dumping end 12. The non-dumping end 14 is bolted to the flange 7 by a series of ten bolts 50 and corresponding nuts, not shown. This end is removed periodically for routine maintenance and repair. Its removable nature further permits easy replacement and redesign.

The furnace is adapted primarily for fusion at rotary speeds in which the centrifugally displaced charge or material to be fused is itself used to insulate the shell, rings, and annular plates of the furnace. The electrodes 80, which provide the source of heat for fusing, create an electric arc 82 between the electrodes 80. The charge 86 insulates the furnace from the high heat produced by the arc 82 and the resulting fused material 84. Consequently, the shell 2, the cylindrical rings 24, 25, 34, 35, 44, and 45, and the annular plates 22, 23, 32, 33, 42, and 43 need not be refractory lined.

The flange 7 in the center of shell 2 has two bores 5 for receiving a clevis 94 from a crane 100 for lifting the rotary furnace. Preferably, annular plate 23 on the non-dumping end 14 is further provided with several projections 54 for allowing a pair of clevises 96, only one of which is shown, from a crane 100 to secure themselves to each side of the non-dumping end 14. Moreover, annular plates 22 and 23 are further provided with a sleeve 26 which is sized such that it may be received by the shell 2, aiding to prevent charge from escaping when the furnace is rotated.

As seen in FIG. 5, a drive system 10 imparts rotation to one of the wheels 8 located on one of the shafts 9. The remaining wheels support the shell 2, allowing the furnace to revolve around its longitudinal axis when the drive system 10 is activated.

In the preferred mode of operation, material to be fused is fed into the door 6 in the shell 2. A piece of cardboard is placed between the clamps 72 and the end plate 62 to prevent the escape of the raw material. The furnace may then be placed on a conventional vibrator station, which shakes the material to ensure that the interior portion of the furnace is coated with such material. Once the furnace is filled with material and the interior of the furnace is filled with material, the furnace is placed on a drive system 10.

The drive system 10 may then be engaged, imparting rotation to the shell 2. The rotation is effected with such speed that the material is compressed uniformly against the inner walls of the shell 2, the cylindrical rings, and annular plates. The cardboard covers may then be cut, the electrodes 80 being placed into the opening 70 at each end of the furnace and then the arc may be struck. Thus, the charge itself provides the insulation to the furnace itself, without the need of a refractory lining in these regions. Preferably, the removable cover 60 should contain refractory lining 66 to prevent burnout of the ends of the furnace.

Once the ingot is formed, a crane 100, by raising clevis 94, may be utilized to lift the furnace off of the wheels 8 and into a location for dumping the ingot from the furnace. The nuts 21 are loosened to remove the dumping end 12 from the shell 2. The crane, by raising clevises 96, may then elevate the non-dumping the furnace. A bin, not shown, may further be provided to catch unused material, in order to reuse such material at a later time.

It is to be understood that the forms of the invention described herewith are to be taken as preferred examples and that various changes in the shape, size and arrangement of parts may be resorted to without departing from the spirit of the invention or scope of the claims.

We claim:

1. A rotary furnace comprising:
a generally cylindrical furnace shell and a decreasing diameter stepped end member attached to each end thereof;
both decreasing diameter stepped end members comprising an alternating series of concentric annular plates, each of which has a different diameter, and concentric ring members, each of which has a different diameter, the annular plate having the largest diameter being attached to one end of the cylindrical furnace shell and to the largest diameter ring member, the annular plate having the second largest diameter being attached to the largest diameter ring member and to the second largest ring member, and each additional annular plate, other than the one having the smallest diameter, being attached to two ring members, with the larger diameter ring member being closer to the furnace shell than the smaller diameter ring member, and the smallest diameter annular plate being attached to the smallest diameter ring member.

2. The rotary furnace of claim 1, wherein both stepped end members have at least three ring members.

3. The rotary furnace of claim 1, wherein both stepped end members are detachably secured to the cylindrical furnace shell.

4. The rotary furnace of claim 3, wherein the shell has a flange at each end for securing the stepped end members thereto.

5. The rotary furnace of claim 4, wherein one of the stepped end members is secured to the shell by a series of bolts and the other stepped end member is secured to the shell by a plurality of fastening members, each of which is bolted to a eyebracket mounted on the flange on the shell and to a protrusion mounted on the stepped end member.

6. The rotary furnace of claim 1, wherein the annular plate having the largest diameter has a sleeve which mates with the furnace shell to help prevent the escape of material during rotation of the furnace.

7. The rotary furnace of claim 1, further comprising a cover secured to the smallest diameter ring member of each stepped end member having a bore for receiving an electrode.

8. The rotary furnace of claim 7, wherein the cover is refractory lined.

9. The rotary furnace of claim 8, wherein the cover has a sleeve which mates with the smallest diameter ring member to help prevent the escape of material during rotation of the furnace.

10. The rotary furnace of claim 1, further comprising means for rotating said furnace.

11. A rotary furnace comprising:
a generally cylindrical furnace shell and a decreasing diameter stepped end member attached to each end thereof;
both decreasing stepped end members comprising an alternating series of three concentric annular plates, each of which has a different diameter, and three concentric ring members, each of which has a different diameter, the annular plate having the largest diameter being attached to one end of the cylindrical furnace shell and to the largest diameter ring member, the annular plate having the second largest diameter being attached to the largest diameter ring member and to the second largest ring member, the annular plate having the third largest diameter being attached to the second largest diameter ring member and to the smallest diameter ring member; and
a cover secured to the smallest diameter ring member having a bore for receiving an electrode.

12. The rotary furnace of claim 11, wherein both stepped end members are detachably secured to the cylindrical furnace shell.

13. The rotary furnace of claim 12, wherein the furnace shell has a flange at each end for securing the stepped end members thereto.

14. The rotary furnace of claim 13, wherein one of the stepped end members is secured to the shell by a series of bolts and the other stepped end member is secured to the shell by a plurality of fastening members, each of which is bolted to a eyebracket mounted on the flange on the shell and to a protrusion mounted on the stepped end member.

15. The rotary furnace of claim 11, wherein the annular plate having the largest diameter has a sleeve which mates with the furnace shell to prevent the escape of material during rotation of the furnace.

16. The rotary furnace of claim 11, wherein the cover is refractory lined.

17. The rotary furnace of claim 16, wherein the cover has a sleeve which mates with the smallest diameter cylindrical ring member to help prevent the escape of material during rotation of the furnace.

18. The rotary furnace of claim 11, further comprising means for rotating said furnace.

19. A rotary furnace comprising:
 a generally cylindrical furnace shell and a decreasing diameter stepped end member attached to each end thereof;
 both decreasing diameter stepped end members comprising an alternating series of at least two concentric annular plates, each of which has a different diameter, and at least two concentric ring members, each of which has a different diameter, the annular plate having the largest diameter being attached to one end of the cylindrical furnace shell and to the largest diameter ring member, the annular plate having the next smaller diameter being attached to the largest diameter ring member and to the ring member with the next smaller diameter.

20. The rotary furnace of claim 19, wherein both stepped end members each have two annular plates and two ring members.

21. The rotary furnace of claim 19, wherein both stepped end members each have at least three annular plates and at least three ring members.

22. The rotary furnace of claim 19, wherein each additional annular plate is attached to two ring members, with the larger diameter ring member to which the plate is attached being closer to the furnace shell than the smaller diameter ring member to which the plate is attached.

23. The rotary furnace of claim 19, further comprising means for rotating said furnace.

* * * * *

UNITED STATES PATENT AND TRADEMARK OFFICE
CERTIFICATE OF CORRECTION

PATENT NO. : 5,235,611
DATED : August 10, 1993
INVENTOR(S) : KENNETH R. JONES ET AL.

It is certified that error appears in the above-identified patent and that said Letters Patent is hereby corrected as shown below:

In column 3, line 34, after "end" please insert --configuration. Preferably, the cylindrical rings and--.

In column 3, line 67, after "sized" please delete ",".

In column 5, line 31, after "non-dumping" please insert --end 14, allowing for the removal of the ingot 84 from--.

Column 6,
In Claim 15, line 63, after "to" please insert --help--.

Signed and Sealed this

Fifth Day of April, 1994

Attest:

BRUCE LEHMAN

Attesting Officer

Commissioner of Patents and Trademarks